3,152,152
24-DEHYDRO CHOLESTEROL ANALOGS AND THE PROCESS FOR THE PREPARATION THEREOF
William J. Wechter, Kalamazoo, Mich., assignor to The Upjohn Company, Kalamazoo, Mich., a corporation of Delaware
No Drawing. Filed June 21, 1962, Ser. No. 204,077
16 Claims. (Cl. 260—397.2)

This invention relates to the known compound desmosterol (24-deyhydrochloresterol) and novel analogs thereof. It further relates to a new process for the preparation of desmosterol and its novel analogs and to novel intermediates therefor.

The compounds of the present invention and processes for their production are illustratively represented by the following sequence of formulae:

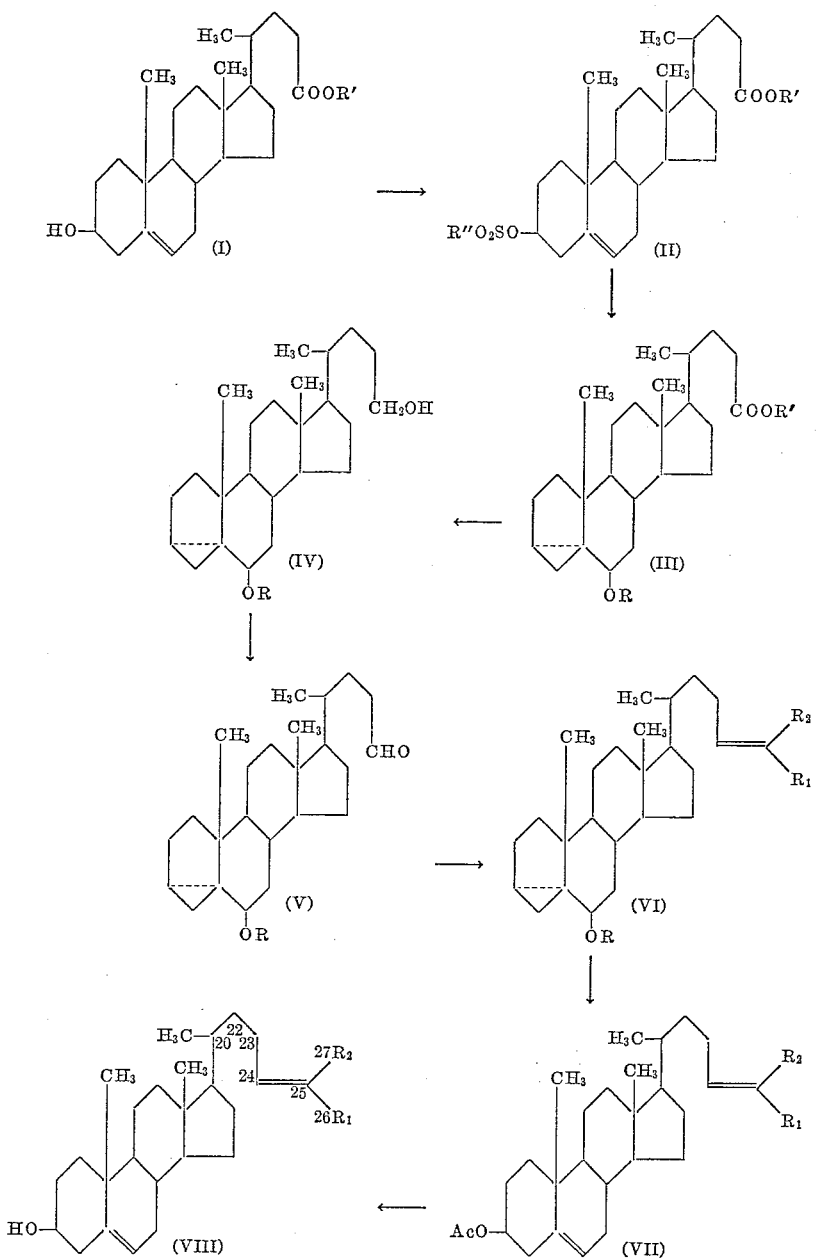

wherein R is an alkyl radical containing from one to eight carbon atoms, inclusive; R' is an organic radical, preferably a lower-alkyl radical containing from one to eight carbon atoms, inclusive; R" is an organic radical containing from one to twelve carbon atoms, inclusive, and is selected from the group consisting of alkyl and aryl; $R_1$ and $R_2$ are selected form the group consisting of hydrogen, halogen, a lower-alkyl radical containing from one to eight carbon atoms, inclusive, trifluoromethyl, pentafluoroethyl, perfluoro lower-alkyl, chloromethyl, an aryl radical containing from one to twelve carbon atoms, inclusive; Ac is the acyl radical of an organic carboxylic acid containing from one to twelve carbon atoms, inclusive.

The compounds of Formulae VII and VIII, above, namely, desmosterol $3\beta$-acylate, desmosterol, their corresponding 26 and 27 substituted and 26, 27-disubstituted analogues, and the desmethyl desmosterols are capable of lowering serum cholesterol levels in such conditions as cardiac ailments and atherosclerosis. The aforesaid compounds are thus useful in the treatment of atherosclerosis, obesity and coronary artery disease in valuable domestic animals. The compounds of Formulae II to VI, inclusive, and especially those of Formula III, exhibit physiological activity as cholesterol mobilizers (as measured in the standard lipidmetabolic assay) and can be effectively used in the treatment of atherosclerosis, obesity and coronary artery disease in valuable domestic animals. These compounds also provide a high yield and novel route to desmosterol and the analogues thereof (VIII). Desmosterol is also used as high purity standard for differential analysis of the desmosterol content of samples of blood sera, liver slices and the like.

The compounds of the present invention can be prepared and administered to mammals, birds, and animals in a wide variety of oral and parenteral dosage forms, singly or in a mixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages.

Desmosterol (VIII) has been produced by routes other than the one employed in the present process, but in lower yield. It has been isolated from barnacles (see: Fagerlund et al., J. Amer. Chem. Soc. 79, 6473 [1957]), and chick embryos and fresh rat skins by Stokes et al. (J. Biol. Chem. 220, 415 [1956], ibid. 232, 347 [1958]).

Desmosterol and the novel analogues thereof (VIII) are prepared in the present process from a known alkyl-3β-hydroxy-5-cholenate (I).

The first step of the novel process involves the 3-sulfonation of a compound of Formula I, e.g., by its reaction in pyridine with an organic sulfonyl halide to yield a 3-aryl or alkyl sulfonate of 3β-hydroxy-5-cholenic acid, alkyl ester (II).

The next step of the process comprises subjecting a compound embrased by Formula II to the i-steroid rearrangement (see: Fieser and Fieser, Steriods, pages 314 to 316, Reinhold Publishing Corp., New York, N. Y., 1959) to give a compound of Formula III. By this procedure a 3-aryl or alkyl sulfonate of 3β-hydroxy-5-cholenic acid, alkyl ester (II) on heating in a solvent such as methanol, ethanol, etc., with an alkali metal acylate, e.g., potassium acetate or sodium benzoate, yields an alkyl 6β-alkoxy-3,5-cyclocholanate (III).

The next step involves reaction of the above-produced alkyl 6β-alkoxy-3,5-cyclocholanate (III) with a reducing agent, e.g., lithium aluminum hydride or lithium aluminum hydride-aluminum chloride complex to give a corresponding 24-alcohol, namely, a 6β-alkoxy-3,5-cyclocholan-24-ol (IV).

In the next step of this invention, a thus-produced 24-ol (IV) is oxidized, preferably by treatment with pyridine-chromic acid complex, to yield a corresponding 24-aldehyde, i.e., a 6β-alkoxy-3,5-cyclocholan-24-al (V).

In the succeeding step of this process the above produced 24-aldehyde compounds (V) are subjected to the well-known Wittig reaction to give the corresponding 6β-alkoxy-i-desmosterols (VI). Any Wittig reagent of the formula

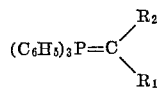

(wherein $R_1$ and $R_2$ are hydrogen, halogen, a lower-alkyl radical containing from one to eight carbon atoms, inclusive, trifluoromethyl, pentafluoroethyl, perfluoro lower-alkyl, chloromethyl, an aryl radical containing from one to twelve carbon atoms, inclusive, and the like, that can be prepared will react readily with a 24-aldehyde compound (V) to give the corresponding 24-dehydro-26 (or 27)-substituted (or -26,27-disubstituted) steroid (VI)).

The Wittig reagents are prepared by known synthetic methods, i.e.,

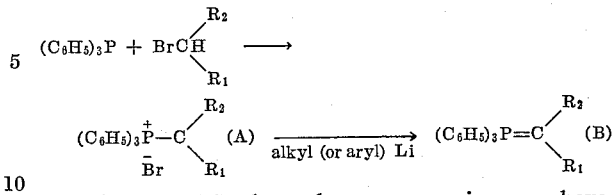

wherein $R_1$ and $R_2$ have the same meanings as above. In preparing the Wittig reagent (B) from the corresponding halide (A), 1 mole of alkyl (or aryl) lithium is reacted with each mole of (A) employed. For an extensive review of the Wittig reaction see: U. Schollkopf, Angew. Chem. 71, 260 (1959); this article contains numerous references.

The next step of the process employs reverse rearrangement; thus a 6β-alkoxy-i-desmosterol (VI) or the corresponding 26 (or 27)-substituted (or 26,27-disubstituted) derivatives (VI) is converted by heating in a suitable solvent (e.g., glacial acetic acid) with a metal acylate, wherein the metal is that of any member of Group II of the Periodic Table (e.g., zinc, magnesium, calcium, barium, etc.) and the acyl radical is that of an organic carboxylic acid of from one to twelve carbon atoms, inclusive (e.g., butyric, cyclopentylacetic, benzoic, napthoic, etc.), to a 3β-acylate of desmosterol (VII) or the corresponding 26 (or 27)-substituted or 26,27-disubstituted derivatives thereof (VII).

The final step of the process of this invention employs a simple hydrolysis. Heating one of the above produced 3β-acylate compounds (VII) with the hydroxide of a metal of Group I of the Periodic Table (e.g., lithium, sodium, potassium, etc.) in an alkanol (e.g., methanol) yields desmosterol (VIII) or the corresponding 26 (or 27)-substituted or 26,27-disubstituted derivatives thereof (VIII).

EXAMPLE 1

*3-p-Toluenesulfonate of 3β-Hydroxy-5-Cholenic Acid, Methyl Ester (II)*

To a solution of 100 g. of the known compound, methyl 3β-hydroxy-5-cholenate (I), in 450 ml. of pyridine, was added 80 g. of p-toluenesulfonyl chloride at room temperature and the reaction mixture stirred for a period of about 18 hours, or until the sulfonation reaction was completed. The solution was then diluted to a volume of about 9 l. with water and the product extracted with methylene chloride. The extracts were washed successively with water, dilute hydrochloric acid and saturated sodium chloride solution, then dried over sodium sulfate and evaporated to dryness in vacuo to give a crystalline residue. The residue was recrystallized from a mixture of acetone and Skellysolve B (hexanes) and treated with Darco (activated carbon) to give 104.8 g. of product melting at 118.5 to 120.5° C. A sample was recrystallized for analysis and yielded the pure 3-p-toluenesulfonate of 3β-hydroxy-5-cholenic acid methyl ester (II) with a melting point of 119.5 to 121.0° C. The infra red spectrum of the purified product was consistent with its expected structure.

*Analysis.*—Calcd. for $C_{32}H_{44}O_5S$: C, 71.07; H, 8.20; S, 5.93. Found: C, 71.01; H, 8.30; S, 5.89.

Following the procedure of Example 1, but employing an organic sulfonyl halide other than p-toluenesulfonyl chloride, e.g., methanesulfonyl chloride, benzenesulfonyl chloride and naphthylsulfonyl bromide, yields, respectively, the corresponding 3-methanesulfonate, 3-benzenesulfonate and 4-naphthylsulfonate of 3β-hydroxy-5-cholenic acid, methyl ester (II).

Following the procedure of Example 1, but substituting as starting materials, ethyl 3β-hydroxy-5-cholenate (I), n-propyl 3β-hydroxy-5-cholenate (I) and secondary butyl 3β-hydroxy-5-cholenate (I), yields, respectively, the corresponding ethyl, n-propyl and secondary butyl esters of the 3-p-toluenesulfonates of 3β-hydroxy-5-cholenic acid (II).

Following the procedure of Example 1, but substituting for methyl 3β-hydroxy-5-cholenate (I) and p-toluenesulfonyl chloride, the following:

(a) Isopropyl 3β-hydroxy-5-cholenate (I) and methanesulfonyl chloride,
(b) Tertiary butyl 3β-hydroxy-5-cholenate (I) and benzene sulfonyl chloride,
(c) n-Amyl 3β-hydroxy-5-cholenate (I) and naphthyl sulfonyl bromide, yields, respectively, (a) The 3-methanesulfonate of 3β-hydroxy-4-cholenic acid, isopropyl ester (II),
(b) The 3-benzene sulfonate of 3β-hydroxy-5-cholenic acid, tertiary butyl ester (II), and
(c) The 3-naphthyl sulfonate of 3β-hydroxy-5-cholenic acid, n-amyl ester (II).

EXAMPLE 2

*Methyl 6β-Methoxy-3,5-Cyclocholanate (III)*

58 g. of the 3-p-toluenesulfonate of 3β-hydroxy-5-cholenic acid, methyl ester (II) (from Example I) and 58 g. of potassium acetate were heated together in 1.45 l. of refluxing methanol for a period of about 3.5 hours (or until the i-steroid rearrangement had gone to completion). About 1 l. of solvent was distilled off, 250 ml. of water added and the residual methanol removed under reduced pressure. The residual product was extracted with methylene chloride. After washing the extracts first with water, next with saturated sodium chloride solution and then drying ($Na_2SO_4$), the solvent was distilled under reduced pressure to give a solid residue. The residue was dissolved in methanol, treated with Darco and crystallized at −20° C. to yield 26 g. of crude product having a melting point of 63.0 to 67.5 C. An analytical sample was obtained by recrystallizing (in the same manner) a position of the crude product; this procedure yielded pure methyl 6β - methoxy - 3,5 - cyclocholanate (III) with a melting point of 71.0 to 72.5° C. and an infra red spectrum consistent with the expected structure.

*Analysis.*—Calculated for $C_{26}H_{42}O_3$: C, 77.56; H, 10.52. Found: C, 77.58; H, 10.60.

Following the procedure of Example 2, but substituting as starting material, instead of the 3-p-toluenesulfonate of 3β-hydroxy-5-cholenic acid, methyl ester (II), the corresponding 3-methanesulfonate (II), 3-benzenesulfonate (II) and 3-naphthyl sulfonate, also yields methyl 6β-methoxy-3,5-cyclocholanate (III).

Following the procedure of Example 2, but substituting for the 3-p-toluenesulfonate of 3β-hydroxy-5-cholenic acid methyl ester (II) and potassium acetate, the following:

(a) The 3-methanesulfonate of 3β-hydroxy-5-cholenic acid isopropyl ester (II) and potassium benzoate,
(b) The 3-benzenesulfonate of 3β-hydroxy-5-cholenic acid tertiary butyl ester (II) and sodium toluate,
(c) The 3-naphthyl sulfonate of 3β-hydroxy-5-cholenic acid n-amyl ester (II) and potassium naphthoate, yields respectively, (a) Isopropyl 6β-methoxy-3,5-cyclocholanate (III),
(b) t-Butyl 6β-methoxy-3,5-cyclocholanate (III), and
(c) n-Amyl 6β-methoxy-3,5-cyclocholanate (III).

EXAMPLE 3

*6β-Methoxy-3,5-Cyclocholan-24-ol (IV)*

30 g. of methyl 6β-methoxy-3,5-cyclocholanate (III) (from Example 2) in 300 ml. of ether was added dropwise to a suspension of 3 g. of lithium aluminum hydride in 300 ml. of ether. After the addition of steroid was completed, the mixture was heated to reflux for a period of about one hour, or until the reduction was completed, and then cooled to the temperature of ice. The excess lithium aluminum hydride was destroyed with 15 ml. of ethyl acetate, followed by the dropwise addition of 25 ml. of 3 M hydrochloric acid. The ether solution was separated, washed consecutively with dilute hydrochloric acid, 4% sodium bicarbonate solution, saturated sodium chloride solution, then dried over sodium sulfate and evaporated to dryness under reduced pressure. The crystalline residue was recrystallized twice to provide an analytical sample of pure 6β-methoxy-3,5-cyclocholan-24-ol (IV), with a melting point of 93.5 to 96.5 C. and an infra red spectrum consistent with the expected structure of the compound.

*Analysis.*—Calculated for $C_{25}H_{42}O_2$: C, 80.15; H, 11:30. Found: C, 80.18; H, 11.34.

Following the procedure of Example 3, but substituting for methyl 6β-methoxy-3,5-cyclocholanate (III), the succeeding starting materials:

(a) Isopropyl 6β-methoxy-3,5-cycloholanate (III)
(b) t-Butyl 6β-methoxy-3,5-cyclocholanate (III), and
(c) n-Amyl 6β-methoxy-3,5-cyclocholanate (III), yields 6β-methoxy-3,5-cyclocholan-24-ol (IV).

EXAMPLE 4

*6β-Methoxy-3,5-Cyclocholan-24-al (V)*

11.6 g. of 6β-methoxy-3,5-cyclocholan-24-ol (IV) from Example 3) dissolved in 20 ml. of pyridine was added at about 15° C. to the pyridine-chromic acid complex prepared from 10 g. of chromic acid and 100 ml. of pyridine. The reaction mixture was stirred for a period of about one hour at room temperature, diluted with 100 ml. of 1:1 ether-benzene and the insoluble materials filtered on a pad of Celite (diatomaceous earth). The solids were washed successively with water and etherbenzene; the combined filtrates were washed several times with water, saturated sodium chloride solution and dried with sodium sulfate. The solvents were removed in vacuo at about 60° C. and the residual pyridine co-distilled with toluene under reduced pressure. The residue obtained was dissolved in methylene chloride and adsorbed onto a 300 g. column of Florisil (synthetic magnesium silicate). The products were eluted from the column over a gradient of 0 to 8% acetone in Skellysolve B with thirty 400 ml. fractions. Fractions 5 to 11 contained the desired 24-aldehyde (V) as shown by its infra red spectrum. A yield of 5.75 g. of crude 6β-methoxy-3,5-cyclocholan-24-al (V) was obtained.

EXAMPLE 5

*6β-methoxy-i-desmosterol (VI)*

7.9 g. of crude 6β-methoxy-3,5-cyclocholan-24-al (V) (from Example 4) dissolved in 75 ml. of benzene was introduced under a cover of nitrogen into a pressure tube containing the yield of reaagent prepared from 30 g. of isopropyl triphenylphosphonium bromide and 26.4 ml. of 2.8 M butyl lithium in 20 ml. of ether. The tube was capped and heated to about 65° C. for a period of approximately 6 hours, or until the desired Wittig (alkylation) reaction was completed. The red solution was filtered and the soild washed with wet ether; the combined filtrates were refiltered, washed twice with saturated sodium chloride solution, dried with sodium sulfate and evaporated to dryness under reduced pressure. The residue obtained was crystallized from a mixture of acetone and Skellysolve B in order to remove most of the triphenylphosphine oxide present; the mother liquors were chromatographed on a 500 g. column of Florisil over a gradient of 0 to 1.5% acetone-Skellysolve B employing twenty, 400 ml. fractions. Fractions 12 to 18 contained 4.33 g. of the desired olefin (VI), which upon low temperature recrystallization from acetone gave 3.67 g. (44% yield) of product with a melting point of 54.0° to 58.5° C.

Recrystallization of a portion of this material from acetone at −20° C. gave an analytical sample of 6β-methoxy-i-desmosterol (VI), melting at 56 to 59° C. and having γ max. at 3060, 1195, 1095 and 1010 cm.⁻¹.

*Analysis.*—Calculated for C₂₈H₄₆O: C, 84.35; H, 11.63. Found: C, 84.20; H, 11.36.

Following the procedure of Example 5 but substituting for isopropyl triphenylphosphonium bromide, ethyl triphenylphosphonium bromide, yields (cis and trans) 26-desmethyldesmosterol (VI).

Following the procedure of Example 5 but substituting for isopropyl triphenylphosphonium bromide, 2-chloroethyl triphenylphosphonium bromide, yields (cis and trans) compounds of the formulae

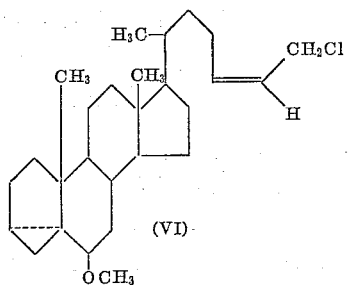

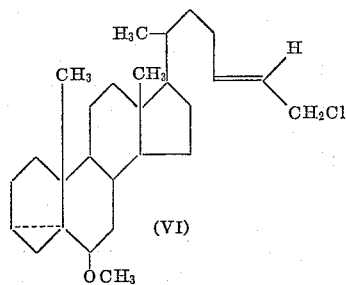

Following the procedure of Example 5 but substituting for isopropyl triphenylphosphonium bromide, 1-trifluoromethyl-2,2,2-trifluoroethyl triphenylphosphonium bromide, yields a compound of the formula

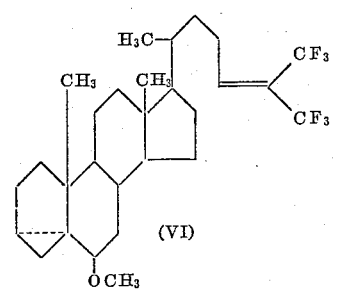

Following the procedure of Example 5 but substituting for isopropyl triphenylphosphonium bromide, benzyl triphenylphosphonium bromide, yields (cis and trans) compounds of the formula

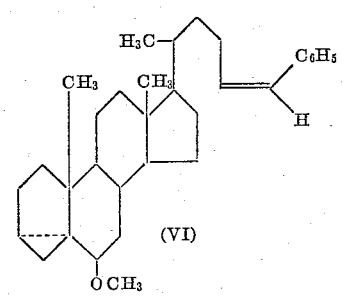

and

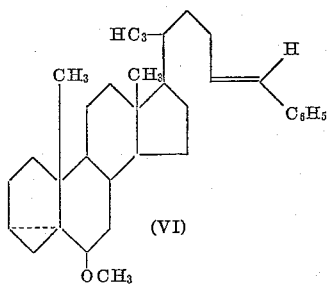

Following the procedure of Example 5 but substituting for isopropyl triphenylphosphonium bromide, diphenylmethyl triphenylphosphonium bromide, yields a compound of the formula

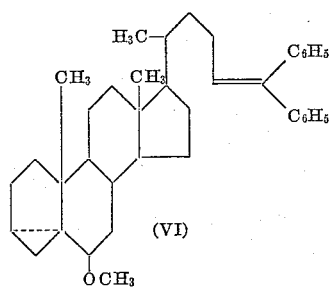

Following the procedure of Example 5 but substituting for isopropyl triphenylphosphonium bromide, a reagent of the formula

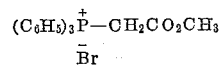

yields (cis and trans) compounds of the formulae

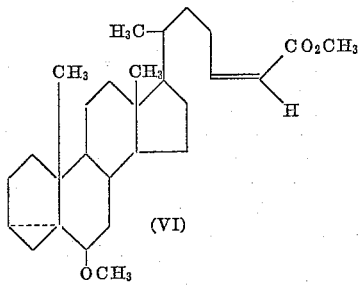

and

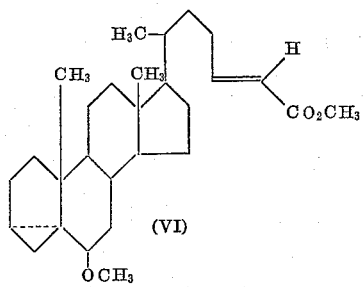

Following the procedure of Example 5 but substituting for isopropyl triphenylphosphonium bromide, a reagent of the formula

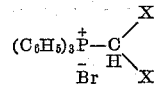

wherein X is fluorine, chlorine or bromine and is the same in both occurrences, said reagent being prepared in the manner disclosed in J. Amer. Chem. Soc. 84, 854 (1962), yields compounds of the formula

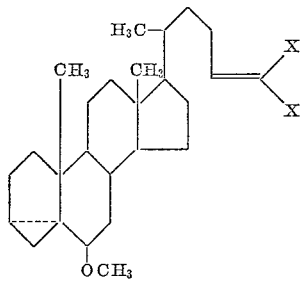

wherein X has the same meaning as above.

In all of the reactions disclosed above for the preparation of the compounds of (VI) from those of (V), the same transformations can be carried out employing instead of butyl lithium, any alkyl (e.g., methyl, ethyl, propyl, etc.) lithium or any aryl (e.g., benzyl, tolyl, xylyl, naphthyl, etc.) lithium.

In all of the above reactions the triphenylphosphonium bromide reagent employed can be replaced by the corresponding triphenylphosphonium chlorides or iodides.

EXAMPLE 6

*Desmosterol 3β-Acetate (VII)*

3.67 g. of 6β-methoxy-i-desmosterol (VI) (from Example 5) and 7.3 g. of zinc acetate dihydrate were suspended in 40 ml. of glacial acetic acid and heated to reflux for a period of about 5 hours (or until the acylation was completed). The mixture was then poured into 500 ml. of water and the product extracted into Skellysolve B. The extracts were washed consecutively with saturated sodium bicarbonate solution, water, saturated sodium chloride solution and dried with sodium sulfate. The solvent was removed from the extracts under reduced pressure and the residue crystallized from a mixture of methanol and water to give 1.9 g. of the known compound, desmosterol 3β-acetate (VII), with a melting point of 93.0 to 93.5° C. (corrected). Absorption spectra for the compound (VII) showed γ max. at 1732, 1371, 1250 and 802 cm.$^{-1}$ and was in good agreement with that previously reported, namely, $\gamma_{max}^{KBr}$ 1735, 1367, 1249 and 804 cm.$^{-1}$ Following the procedure of Example 6 but employing instead of zinc acetate, another metal acetate wherein the metal is chosen from Group II of the Periodic Table (e.g., magnesium, calcium, barium, strontium, cadmium, etc.), also yields desmosterol, 3β-acetate (VII).

Following the procedure of Example 6 but employing instead of zinc acetate, another metal acylate wherein the metal is chosen from Group II of the Periodic Table (e.g., magnesium, calcium, barium, strontium, cadmium, etc.) and the acyl radical is that of an organic carboxylic acid of from one to twelve carbon atoms, inclusive (e.g., butyric, octanoic, cyclopentylacetic, benzoic, α-naphthoic, phenylacetic, etc.), and instead of acetic acid, an acid with an acyl group corresponding to the acyl group of the metal acylate, gives the corresponding 3β-acylate of desmosterol (VII).

Following the procedure of Example 6, but employing as starting material any of the compounds (VI) prepared following Example 5 instead of 6β-methoxy-i-desmosterol (VI), yields the corresponding 26, 27-analogs of (VII), e.g.,

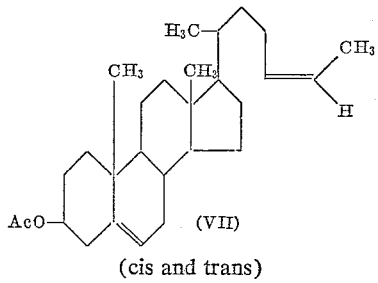

(cis and trans)

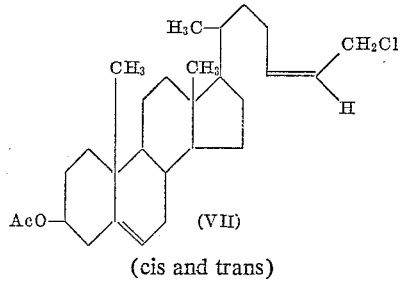

(cis and trans)

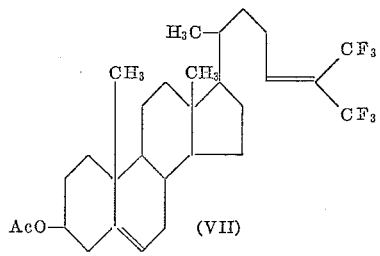

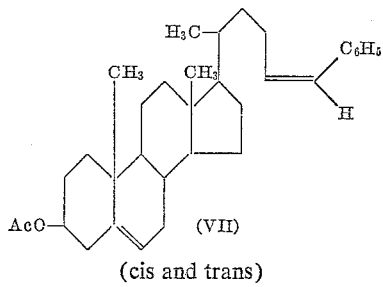

(cis and trans)

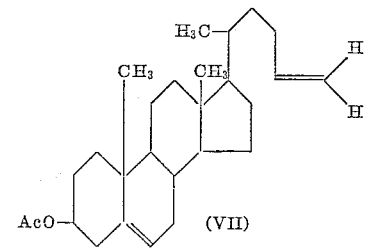

and

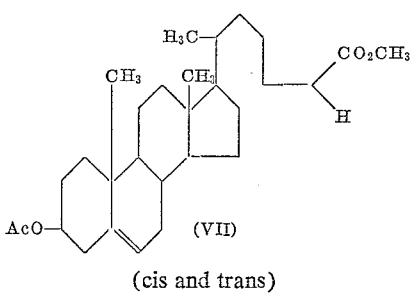

(cis and trans)

wherein Ac is the acyl radical of an organic carboxylic acid containing from one to twelve carbon atoms, inclusive.

EXAMPLE 7

Desmosterol (24-Dehydrocholesterol) (VIII)

1.9 g. of desmosterol, 3β-acetate (VII) (from Example 6) was suspended in 300 ml. of 5% potassium hydroxide in methanol, 10 ml. of water was added and the suspension heated to reflux for a period of about one hour (or until hydrolysis was complete). The volume was reduced to about 200 ml. by distillation and water then added to incipient crystallization, after which the volume was further reduced to give (in two crops) the desired product, desmosterol (VIII). Crop 1 contained 1.584 g. and had a melting point of 119 to 120° C. (corrected); Crop 2 weighed 0.122 g. and melted at 118 to 119.5 C. (corrected). The absorption spectrum of this compound (VIII) showed γ max. at 3360, 1500 (shoulder) and 802 cm.$^{-1}$. (Desmosterol is reported in the literature as having a melting point of 120.5 to 121° C. and γ max. at 3360, 1490 and 801 cm.$^{-1}$.) The nuclear magnetic resonance spectrum of the compound prepared above (VIII) confirmed its predicted structure in all details; the material (VIII) exhibited a single peak by vapor phase chromatography employing a column composed of 2% of GE–SE–30 (methyl silicones) on 98% of Chromasorb W (Johns-Manville Co. diatomaceous earth) at 250° C., with a retention time of 12.6 minutes.

*Analysis*:—Calculated for $C_{27}H_{44}O$: C, 84.31; H, 11.53. Found: C, 84.65; H, 10.50.

Following the procedure of Example 7 but employing instead of potassium hydroxide, another alkali metal hydroxide wherein the alkali metal is chosen from Group I of the Periodic Table (e.g., lithium, sodium, etc.), also yields desmosterol (VIII).

Following the procedure of Example 7, but employing as starting materials any of the compounds (VII) prepared following Example 6 instead of desmosterol, 3β-acetate (VII), yields the corresponding 26,27-analogs of (VIII), e.g.,

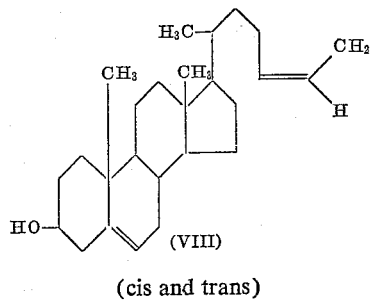

(cis and trans)

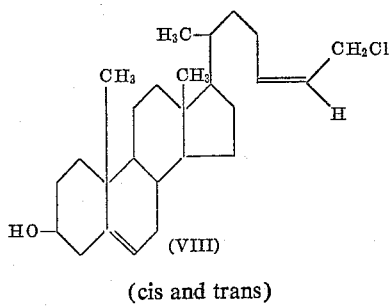

(cis and trans)

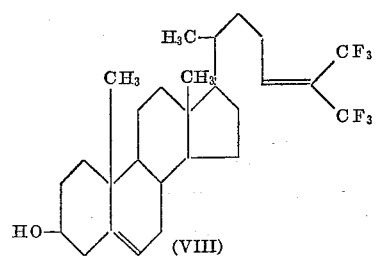

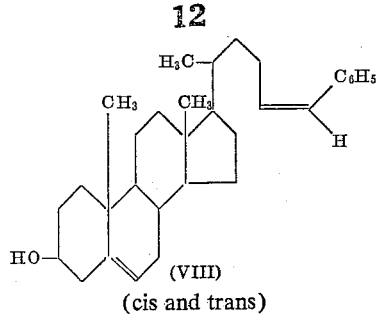

(cis and trans)

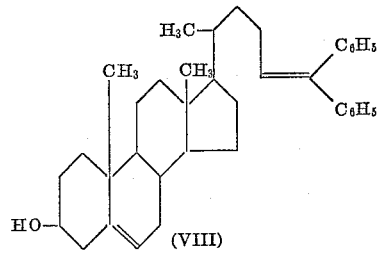

(VIII)

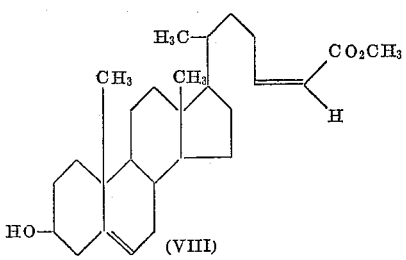

(VIII)

(cis and trans)

I claim:

1. 6β-methoxy-3,5-cyclocholan-24-ol of the formula

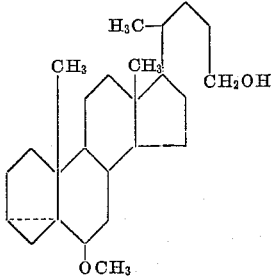

2. 6β-methoxy-3,5-cyclocholan-24-al of the formula

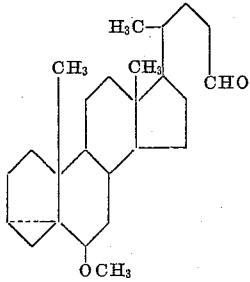

3. Compounds of the formula

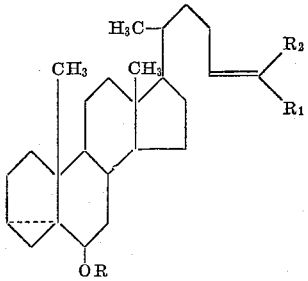

wherein R is an alkyl radical containing from one to eight carbon atoms, inclusive; $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above.

4. 6β-methoxy-i-desmosterol of the formula

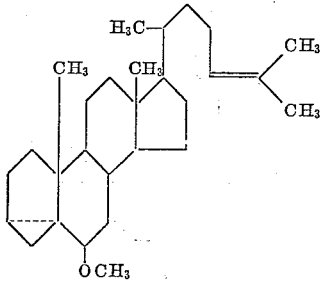

5. Compounds of the formula

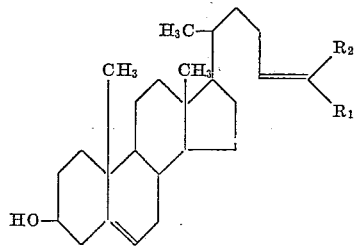

wherein $R_1$ and $R_2$ are (a) different and are selected from the group consisting of hydrogen, halogen, ethyl, propyl, butyl, trifluoromethyl, chloromethyl, acetoxy and phenyl, and (b) alike and have the same meanings as above.

6. A process for the production of a compound of the Formula VIII

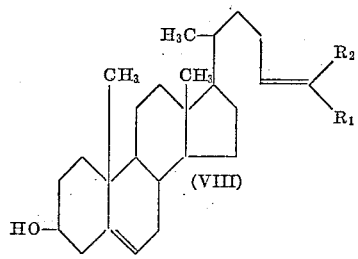

wherein $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above, which comprises: (1) treating a compound of the Formula I

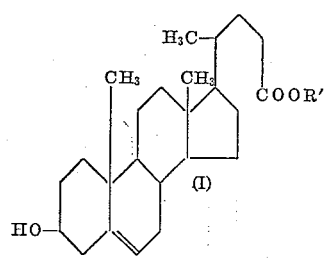

wherein R' is a lower-alkyl radical containing from one to eight carbon atoms, inclusive, with an organic sulfonyl halide to give a compound of the Formula II

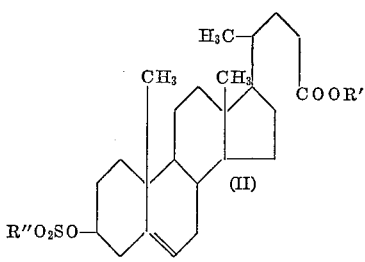

wherein R' has the same meaning as above and R'' is an organic radical containing from one to twelve carbon atoms, inclusive, and is selected from the group consisting of alkyl and aryl; (2) subjecting a thus produced compound of Formula II to reaction with an alkali metal acylate to obtain a compound of the Formula III

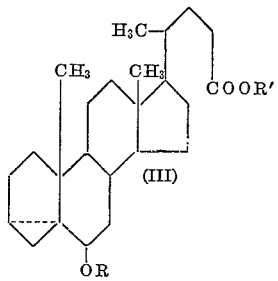

wherein R' has the same meaning as above and R is an alkyl radical containing from one to eight carbon atoms, inclusive; (3) treating a thus prepared compound of Formula III with a reducing agent to give a compound of the Formula IV

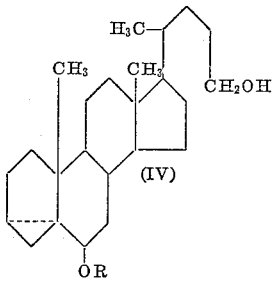

wherein R has the same meaning as above; (4) treating a thus produced compound of Formula IV with an oxidizing agent to yield a compound of the Formula V

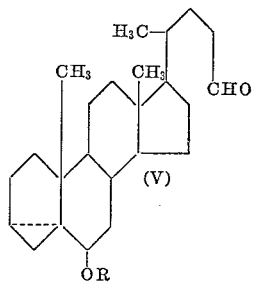

wherein R has the same meaning as above; (5) subjecting a thus obtained compound of Formula V to the Wittig reaction to yield a compound of the Formula VI

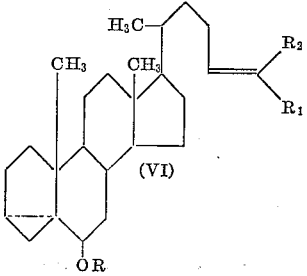

wherein R, $R_1$ and $R_2$ have the same meanings as above; (6) subjecting a thus produced compound of Formula VI to reverse-rearrangement by reaction with a metal acylate, wherein the metal is selected from Group II of the Periodic Table and the acyl radical is that of an organic carboxylic acid containing from one to twelve carbon atoms, inclusive, to give a compound of the Formula VII

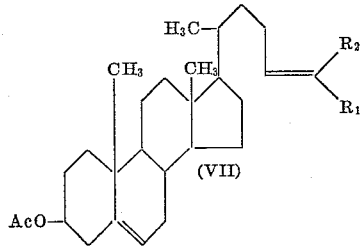

wherein Ac is the acyl radical of an organic carboxylic acid containing from one to twelve carbon atoms, inclusive, and $R_1$ and $R_2$ have the same meanings as above, and (7) hydrolyzing a thus produced compound of Formula VII to obtain compound of Formula VIII, above.

7. A process for the production of a compound of the Formula VIII

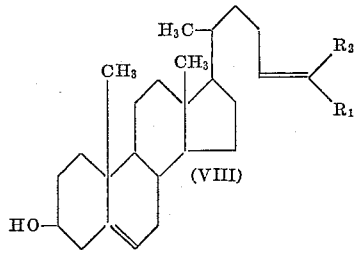

wherein $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above, which comprises: (1) treating the compound of the Formula I

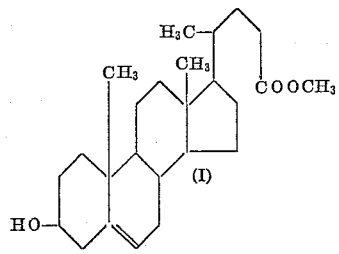

with an organic sulfonyl halide to produce a corresponding 3-organic acid sulfonate compound of the Formula II

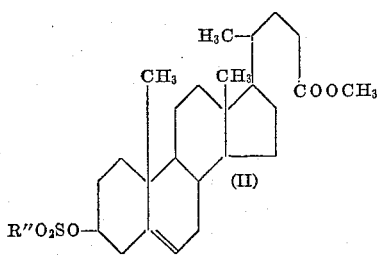

wherein R" is an organic radical containing from one to twelve carbon atoms, inclusive, and is selected from the group consisting of alkyl and aryl; (2) subjecting a thus produced compound of Formula II to reaction with an alkali metal acylate to obtain the compound of Formula III

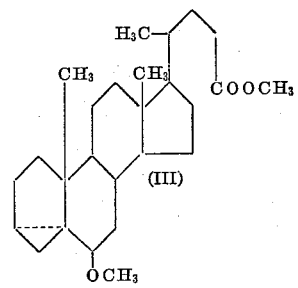

(3) treating the thus produced compound of Formula III with a reducing agent to give the compound of the Formula IV

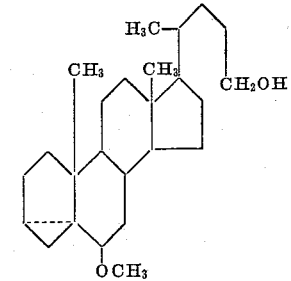

(4) treating the thus produced compound of Formula IV with an oxidizing agent to yield the compound of the Formula V

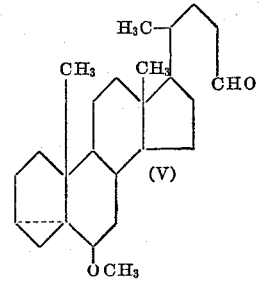

(5) subjecting the thus obtained compound of the Formula V to the Wittig reaction to yield a compound of the Formula VI

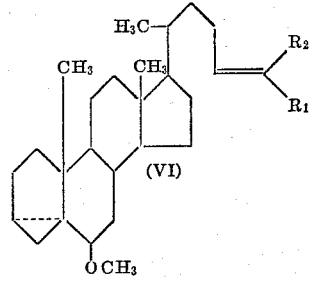

wherein $R_1$ and $R_2$ have the same meanings as above; (6) subjecting the thus produced compound of Formula VI to reverse rearrangement by reaction with a metal acylate, wherein the metal is selected from Group II of the Periodic Table and the acyl radical is that of an organic carboxylic acid containing from one to twelve carbon atoms, inclusive, to give a compound of Formula VII

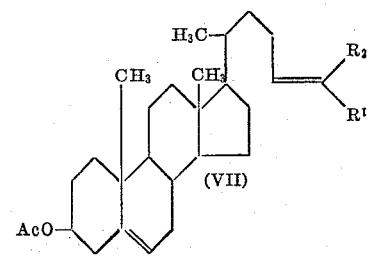

wherein $R_1$ and $R_2$ have the same meanings as above and Ac is the acyl radical of an organic carboxylic acid containing from one to twelve carbon atoms, inclusive, and (7) hydrolyzing a thus produced compound of Formula VII to obtain a compound of Formula VIII, above.

8. A process for the production of the compound of the Formula VIII

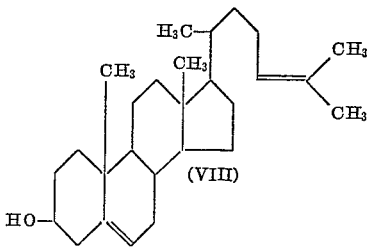

which comprises: (1) treating the compound of the formula I

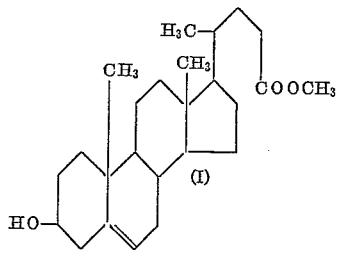

which p-toluenesulfonyl chloride to give the compound of the Formula II

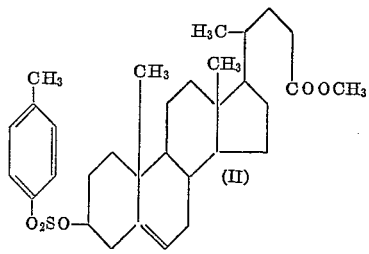

(2) subjecting the thus produced compound of Formula II to reaction with potassium acetate to obtain the compound of the Formula III

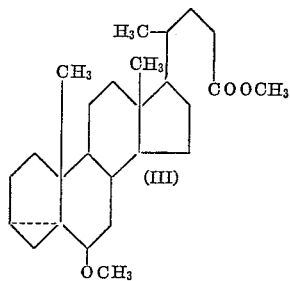

(3) treating the compound of Formula III with lithium aluminum hydride to give the compound of the Formula IV

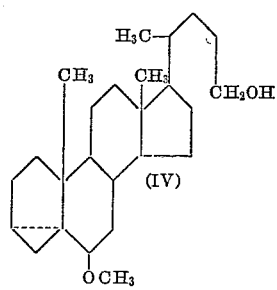

(4) treating the thus produced compound of Formula IV with chromic acid to yield the compound of the Formula V

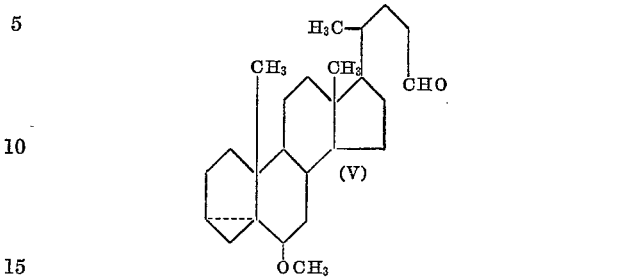

(5) subjecting the thus obtained compound of Formula V to reaction with isopropyltriphenylphosphonium bromide and butyl lithium to yield the compound of the Formula VI

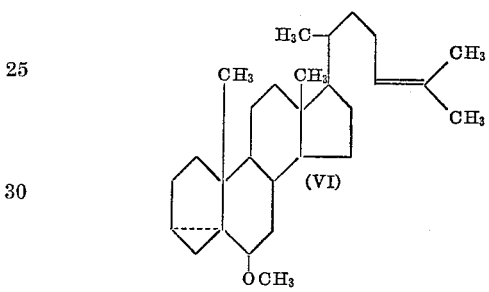

(6) subjecting the thus produced compound of Formula VI to reaction with zinc acetate to give the compound of the Formula VII

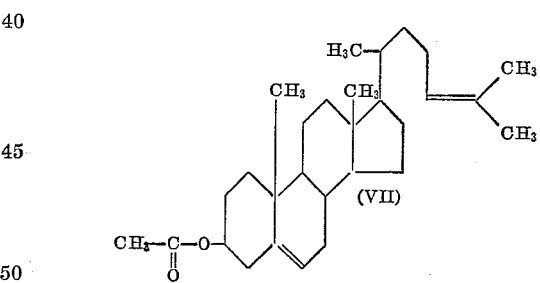

and (7) hydrolyzing the thus produced compound of Formula VII with potassium hydroxide in methanol to obtain the compound of Formula VIII, above.

9. A process for the production of a compound of the Formula VIII

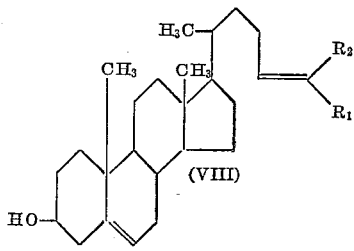

wherein $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above, which comprises: (1) treating a compound of the Formula III

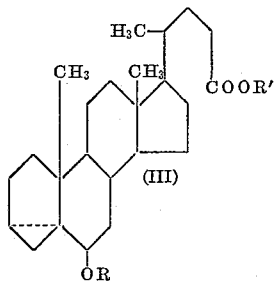

wherein R and R' are alkyl radicals containing from one to eight carbon atoms, inclusive, with a reducing agent to give a compound of the Formula IV

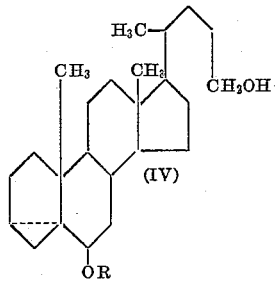

wherein R has the same meaning as above; (2) treating a thus produced compound of Formula IV with an oxidizing agent to yield a compound of the Formula V

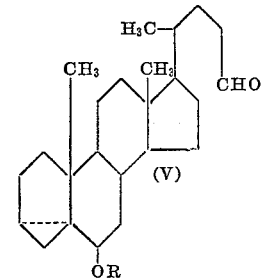

wherein R has the same meaning as above; (3) subjecting a thus obtained compound of Formula V to the Wittig reaction to yield a compound of the Formula VI

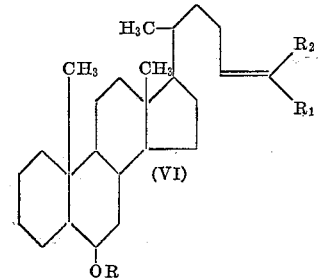

wherein R, $R_1$ and $R_2$ have the same means as above; (4) subjecting a thus produced compound of Formula VI to reverse rearrangement by reaction with a metal acylate, wherein the metal is selected from Group II of the Periodic Table and the acyl radical is that of an organic carboxylic acid containing from one to twelve carbon atoms, inclusive, to give a compound of the Formula VII

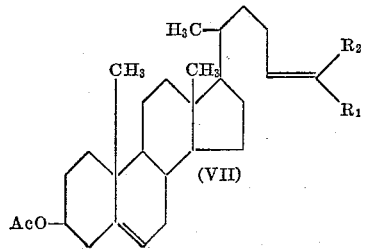

wherein Ac is the acyl radical of an organic carboxylic acid containing from one to twelve carbon atoms, inclusive, and $R_1$ and $R_2$ have the same meanings as above, and (5) hydrolyzing a thus produced compound of Formula VII to obtain a compound of Formula VIII, above.

10. A process for the production of the compound of the Formula VIII

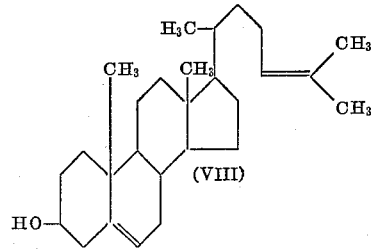

which comprises: (1) treating the compound of the Formula III

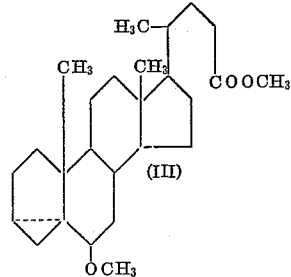

with lithium aluminum hydride to obtain the compound of the Formula IV

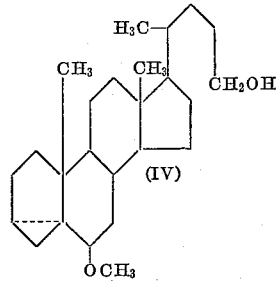

(2) treating the thus produced compound of Formula IV with chromic acid to yield the compound of Formula V

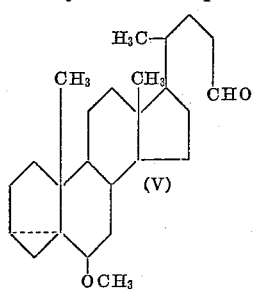

(3) subjecting the thus obtained compound of Formula V to reaction with triphenylphosphonium bromide and butyl lithium to yield the compound of the Formula VI

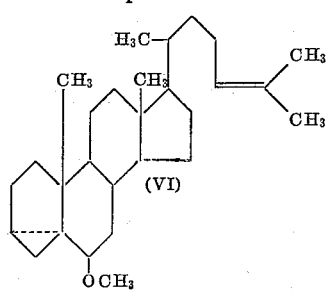

(4) subjecting the thus produced compound of Formula VI to reaction with zinc acetate to give the compound of the Formula VII

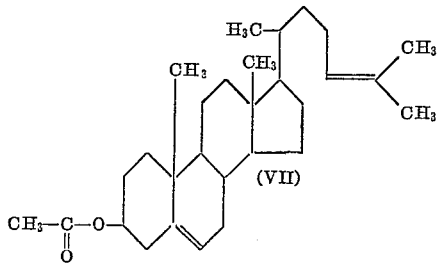

and (5) hydrolyzing the thus produced compound of Formula VII with potassium hydroxide in methanol to obtain the compound of Formula VIII, above.

11. A process for the production of a compound of the Formula VIII

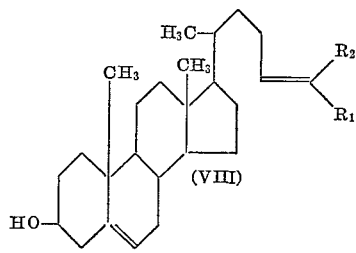

wherein $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above, which comprises: (1) treating a compound of the Formula IV

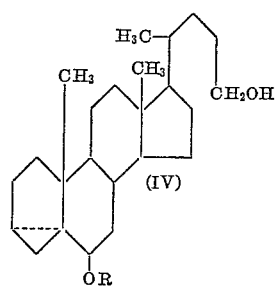

wherein R is an alkyl radical containing from one to eight carbon atoms, inclusive, with an oxidizing agent to yield a compound of the Formula V

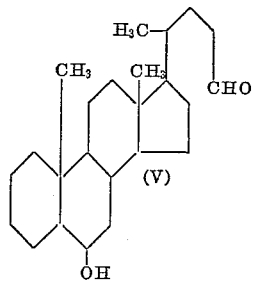

wherein R has the same meaning as above; (2) subjecting a thus obtained compound of Formula V to the Wittig reaction to yield a compound of the Formula VI

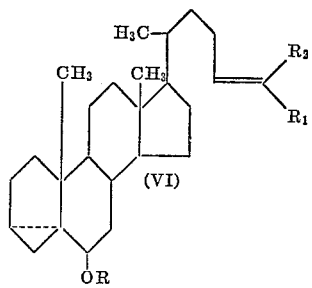

wherein R, $R_1$ and $R_2$ have the same meanings as above; (3) subjecting a thus produced compound of Formula VI to reverse rearrangement by reaction with a metal acylate, wherein the metal is selected from Group II of the Periodic Table and the acyl radical is that of an organic carboxylic acid containing from one to twelve carbon atoms, inclusive, to give a compound of the Formula VII

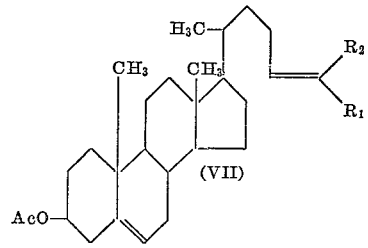

wherein Ac is the acyl radical of an organic carboxylic acid containing from one to twelve carbon atoms, inclusive, and $R_1$ and $R_2$ have the same meanings as above, and (4) hydrolyzing a thus produced compound of Formula VII to obtain a compound of Formula VIII, above.

12. A process for the production of the compound of the Formula VIII

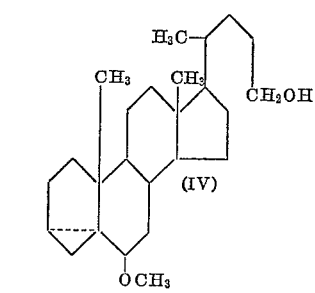

which comprises: (1) treating the compound of the Formula IV with chromic acid to yield the compound of the Formula V

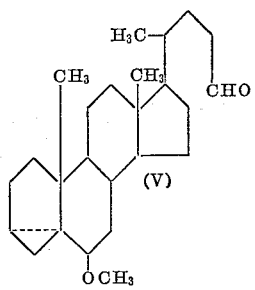

(2) subjecting the thus obtained compound of Formula V to reaction with triphenylphosphonium bromide and butyl lithium to yield the compound of the Formula VI

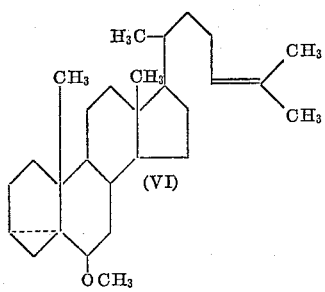

(3) subjecting the thus produced compound of Formula VI to reaction with zinc acetate to give the compound of the Formula VII

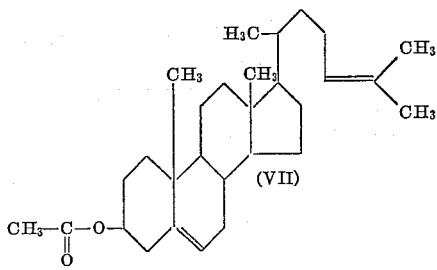

and (4) hydrolyzing the thus produced compound of Formula VII with potassum hydroxide in methanol to obtain the compound of Formula VIII, above.

13. A process for the production of a compound of the Formula VIII

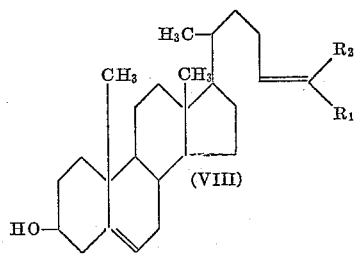

wherein $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above, which comprises: (1) subjecting a compound of the Formula V

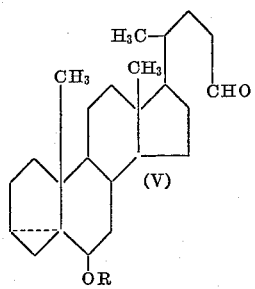

wherein R is an alkyl radical containing from one to eight carbon atoms, inclusive, to the Wittig reaction to yield a compound of the Formula VI

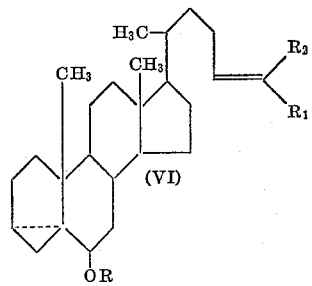

wherein R, $R_1$ and $R_2$ have the same meanings as above; (2) subjecting a thus produced compound of Formula VI to reverse rearrangement by reaction with a metal acylate, wherein the metal is selected from Group II of the Periodic Table and the acyl radical is that of an organic carboxylic acid containing from one to twelve carbon atoms, inclusive, to give a compound of the Formula VII

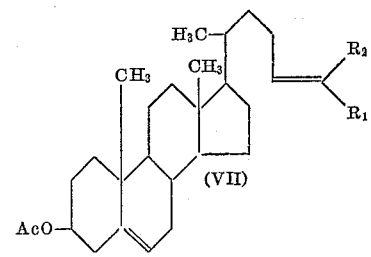

wherein Ac is the acyl radical of an organic carboxylic acid containing from one to twelve carbon atoms, inclusive, and $R_1$ and $R_2$ have the same meanings as above, and (4) hydrolyzing a thus produced compound of Formula VII to obtain a compound of Formula VIII, above.

14. A process for the production of a compound of the Formula VI

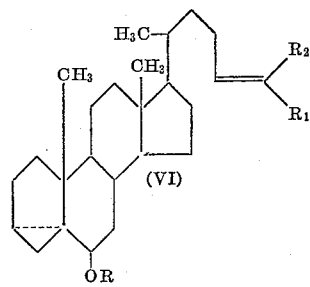

wherein R is an alkyl radical containing from one to eight carbon atoms, inclusive; $R_1$ and $R_2$ are (a) different and are selected from the group consisting of hydrogen, halogen, a lower alkyl radical containing from one to eight carbon atoms, inclusive, trifluoromethyl, chloromethyl, acetoxy and phenyl, and (b) alike and have the same meanings as above, which comprises subjecting a compound of the Formula V

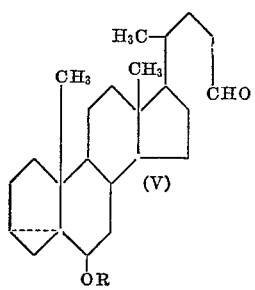

wherein R has the same meaning as above, to the Wittig reaction.

15. A process for the production of the compound of the Formula VIII

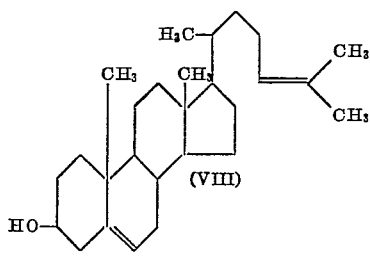

which comprises: (1) treating the compound of the Formula V

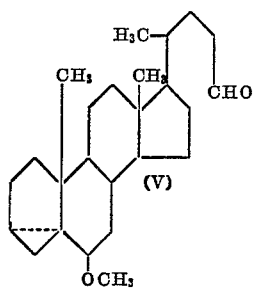

with triphenylphosphonium bromide and butyl lithium to yield the compound of the Formula VI

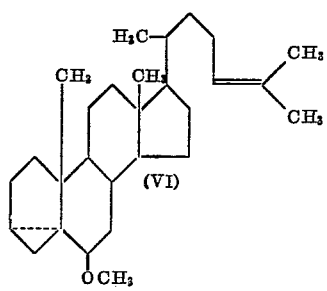

(2) subjecting the thus produced compound of Formula VI to reaction with zinc acetate to give the compound of the Formula VII

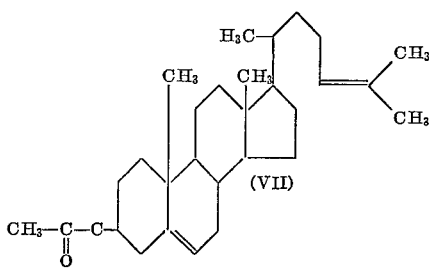

and (3) hydrolyzing the thus produced compound of Formula VII with potassium hydroxide in methanol to obtain the compound of Formula VIII, above.

16. A process for the production of a compound of the Formula VI

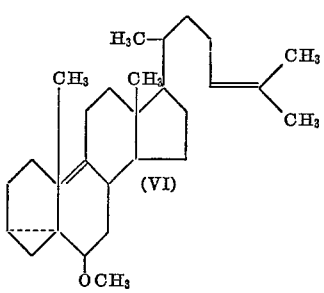

which comprises treating the compound of the Formula V

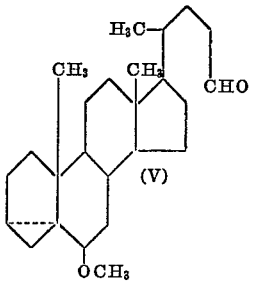

with triphenylphosphonium bromide and butyl lithium.

References Cited in the file of this patent
UNITED STATES PATENTS

| | | |
|---|---|---|
| 2,427,368 | Riegel et al. | Sept. 16, 1947 |
| 2,781,364 | Ziegler et al. | Feb. 12, 1957 |